United States Patent [19]

Schiff et al.

[11] Patent Number: 5,449,105
[45] Date of Patent: Sep. 12, 1995

[54] METHOD AND APPARATUS FOR STORING COINS IN A VEHICLE

[75] Inventors: Jon D. Schiff, St. Joseph; Daniel R. Vander Sluis, Lawton, both of Mich.

[73] Assignee: Atlantic Automotive Components, Inc., Benton Harbor, Mich.

[21] Appl. No.: 233,772

[22] Filed: Apr. 26, 1994

[51] Int. Cl.6 ............................................. B60R 7/00
[52] U.S. Cl. ........................... 224/281; 206/0.8; 206/0.81; 206/0.82; 206/0.83; 296/37.8; 297/188.17; 224/483; 224/544; 224/554; 224/571
[58] Field of Search ............... 224/281, 42.41, 42.42, 224/42.43, 42.44, 273, 275, 280; 296/37.8, 37.9, 37.12; 206/0.8, 0.81, 0.82, 0.83, 0.84; 297/188.15, 188.16, 188.17

[56] References Cited

U.S. PATENT DOCUMENTS

| | | | |
|---|---|---|---|
| D. 304,124 | 10/1989 | Charet et al. | D99/34 |
| 2,800,360 | 7/1957 | Jenkins | 224/281 |
| 4,453,759 | 6/1984 | Kathiria | 296/37.8 |
| 4,494,806 | 1/1985 | Williams et al. | 296/37.9 |
| 4,512,503 | 4/1985 | Gioso | 224/42.42 R |
| 4,537,439 | 8/1985 | Otani | 296/37.9 |
| 4,568,117 | 2/1986 | McElfish et al. | 224/280 |
| 4,852,932 | 8/1989 | Komeya et al. | 296/37.9 |
| 5,112,276 | 5/1992 | Sapeth | 453/54 |
| 5,141,194 | 8/1992 | Burgess et al. | 297/188.17 |
| 5,267,893 | 12/1993 | Mangigian | 296/37.9 |

FOREIGN PATENT DOCUMENTS

| | | | |
|---|---|---|---|
| 0109754 | 4/1990 | Japan | 224/281 |
| 4038238 | 2/1992 | Japan | 224/281 |

*Primary Examiner*—Henry J. Recla
*Assistant Examiner*—Timothy L. Maust
*Attorney, Agent, or Firm*—Brooks & Kushman

[57] ABSTRACT

An apparatus for storing coins in a vehicle includes a housing adapted to be located in a vehicle. A carrier is movably connected with respect to the housing and includes a coinholder. The carrier is movable between a stored position inside the housing to conceal the coinholder and a use position outside the housing to expose the coinholder to a user. A spring and latch are provided to facilitate movement between the stored and the use positions. Responsive to a push from a user, a carrier travels from the stored position to the use position. The carrier may be returned from the use position to the stored position by a further push from the user. A method for providing coin storage in a vehicle is also contemplated.

17 Claims, 3 Drawing Sheets

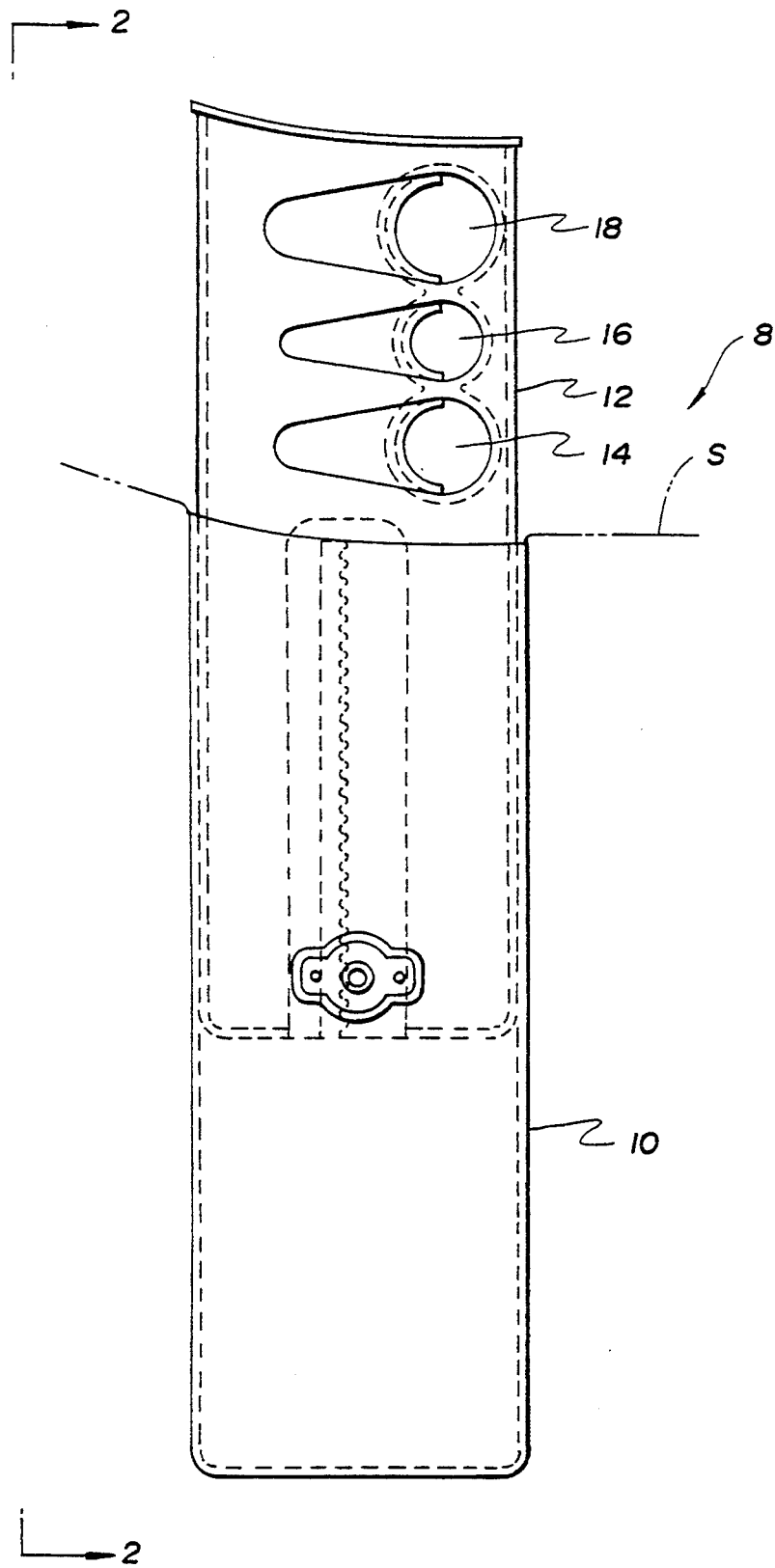

METHOD AND APPARATUS FOR STORING COINS IN A VEHICLE

TECHNICAL FIELD

The present invention relates to a method and apparatus for storing coins, and more particularly to a method and apparatus for concealing coins in a vehicle.

BACKGROUND ART

It is commonly known to provide coinholders in a vehicle instrument panel or console. Easy-access coinholders are very useful when paying tolls or using parking meters. Commonly, coinholders are provided in vehicles which are easily accessible to the driver for such purposes.

Known coinholders usually comprise an open tray in a vehicle console or a coin storage device located in the vehicle. For example, U.S. Pat. No. 4,512,503 to Gioso discloses an all purpose vehicle travel organizer, including coinholder sleeves. U.S. Pat. No. 5,112,276 to Spaeth discloses a combination coinholder and mileage minder for mounting in a vehicle.

A major problem with these coinholders is that they are often within view of bypassers, thus creating an enticement for thieves to enter the vehicle. Another major problem with these coinholders is that they are often unsightly and aesthetically unappealing to the consumer. They can be cumbersome and appear messy when coins are strewn about the coinholder in open view to the user. This problem has been addressed by inventions such as U.S. Pat. No. 4,537,439 to Otani, which discloses a reversible ashtray assembly for a vehicle which may be turned over for use as a coinholder tray. However, this design disables use of the ashtray when the coinholder tray is in use. In addition, the coins are loose in the tray, thus creating a possible rattle problem in the vehicle. Furthermore, the user must bend forward and reach into the instrument panel in order to access coins.

It is desirable to develop a coinholder which is easily accessible to the driver, is aesthetically appealing to vehicle occupants, and holds coins out of view from bypassers. Preferably, such a coinholder would be attached to a vehicle console for optimal driver accessibility.

DISCLOSURE OF THE INVENTION

An apparatus for storing coins in a vehicle according to the present invention includes a housing adapted to be located in the vehicle. A carrier is movably connected with respect to the housing and includes a coinholder. The carrier is movable between a stored position inside the housing to conceal the coinholder and a use position outside the housing to expose the coinholder sufficiently for easy user access. A means for moving the carrier between the stored and use positions includes a spring elastically biasing the carrier toward the use position relative to the housing and a latch for retaining the carrier in the stored position. The latch includes release means responsive to relative movement of the carrier in the direction away from the use position, which releases the carrier to allow the spring to move the carrier to the use position, thus exposing the coinholder.

A preferred apparatus for storing coins in a vehicle according to the present invention includes a carrier movably connected with respect to a center console in the vehicle. The carrier includes a coinholder and is vertically movable between a stored position inside the console to conceal the coinholder and a use position above the console to expose the coinholder sufficiently for easy user access. A means for moving the carrier between the stored and use positions includes a spring biasing the carrier toward the use position and a latch for retaining the carrier in the stored position. The latch includes release means responsive to relative movement of the carrier in the direction away from the use position to permit the automatic movement of the carrier by the spring to the use position.

The present invention further contemplates a method for providing coin storage in a vehicle. First, a chamber is provided in a vehicle housing for slidably receiving a carrier. A carrier is connected inside the chamber by a drive mechanism and a latch for selective carrier movement between a storage position inside the chamber and a use position outside the chamber. Movement of the carrier to the use position occurs responsive to pushing the carrier while in the stored position in a direction away from the use position. A coinholder is connected to the carrier such that the coinholder is concealed when the carrier is pushed to the storage position and exposed when the carrier is automatically extended to the use position.

Accordingly, an object of the present invention is to provide an apparatus for storing coins with optimal accessibility to the driver of a vehicle.

A further object of the present invention is to provide an apparatus for storing coins which conceals coins in the vehicle for aesthetic reasons and for theft prevention.

Another object of the present invention is to provide an apparatus for storing coins which conceals coins in a manner so as not to rattle when the vehicle is in operation.

Yet another object of the present invention is to provide an apparatus for storing coins which automatically pops up from inside a vehicle housing immediately after the user presses it into the housing.

A still further object of the present invention is to provide an apparatus for storing coins which automatically locks into a vehicle housing when it is pressed into the housing by the user.

Still another object of the present invention is to provide a method for concealing coins in a vehicle which provides easy coin access to the driver and is aesthetically pleasing.

These and other objects, features and advantages of the present invention will be more thoroughly understood with reference to the accompanying drawings and description.

BRIEF DESCRIPTION OF THE DRAWINGS

FIG. 1 is a driver side view of an apparatus for storing coins according to the present invention, with the carrier shown in the use position.

BEST MODE FOR CARRYING OUT THE INVENTION

Figures 2, 3:
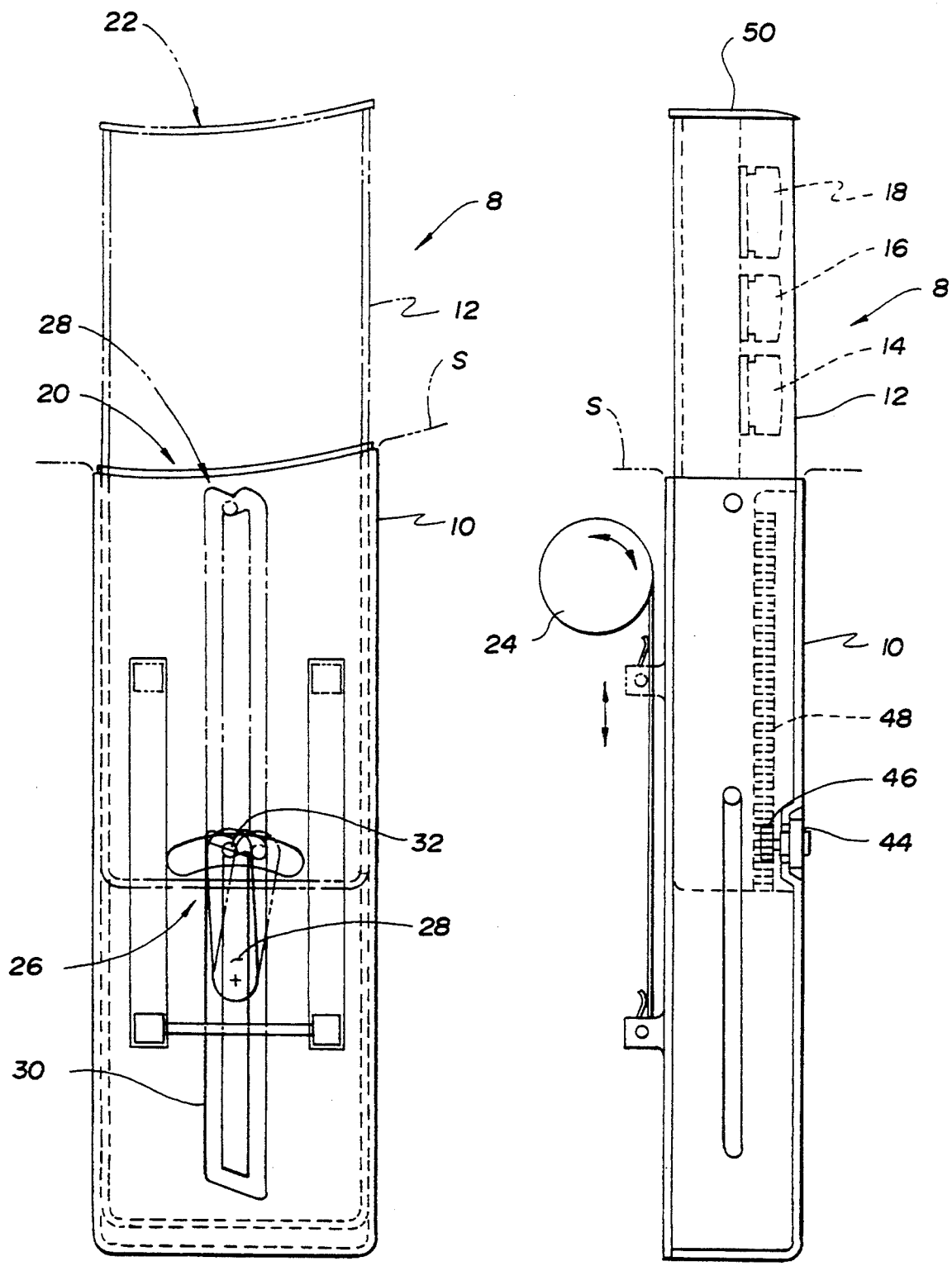
FIG. 2 is a front side view of an apparatus for storing coins according to the present invention, with the carrier shown in the use position.
FIG. 3 is a passenger side view of an apparatus for storing coins in a vehicle according to the present invention in the stored position and shown in phantom in the use position.

Referring to FIGS. 1–5, a preferred embodiment of an apparatus for storing coins 8 in a vehicle according to the present invention is shown. A housing 10 is adapted to be located in the vehicle. A carrier 12 is movably connected with respect to the housing 10 and includes a number of coinholders 14,16,18 for coins of various denominations. The carrier 12 is movable between a stored position 20 inside the housing 10 to conceal the coinholders and a use position 22 outside the housing 10 to expose the coinholders sufficiently for easy user access.

Means for moving the carrier 12 between the stored and use positions is provided and includes a spring 24 elastically biasing the carrier 12 toward the use position relative to the housing 10. The spring 24 is preferably a tape measure type rotary spring.

Normally, a spring has a force equal to the spring constant (k) multiplied by the travel (x). (F=kx). However, a tape measure type rotary spring, has a spring force which is always equal to the spring constant and does not depend upon the travel (x). This constant spring force provides for the desired smooth operation of the apparatus in a vehicle. Other types of springs may result in inconsistent or jerky motion of the carrier. Alternative embodiments of the spring 24 would include a compression spring or a tension spring.

The means for moving the carrier 12 further includes a latch 26 for retaining the carrier 12 in the stored position 20. The latch 26 includes a release mechanism which provides release means responsive to relative movement of the carrier 12 in the direction away from the use position 22 to permit sufficient movement of the carrier 12 to expose the coinholders for easy user access in the use position 22.

The latch 26 includes a cam track 30 and a follower 32. Follower 32 is mounted on one end of a pivotal link 28 which enables the follower to move side to side in an arc while limiting axial movement. The cam track 30 has a first portion 34 in cooperative relationship with the follower 32 to retain the carrier 12 in the stored position 20, and has a second portion 36 in selective cooperation with the follower 32 to form the release mechanism. In the illustrated embodiment the cam track is formed on carrier 12 and the follower 12 is pivotably affixed to housing 10 by link 28, however, the latching mechanism could easily be altered to form the cam track in the housing.

Figure 4A:
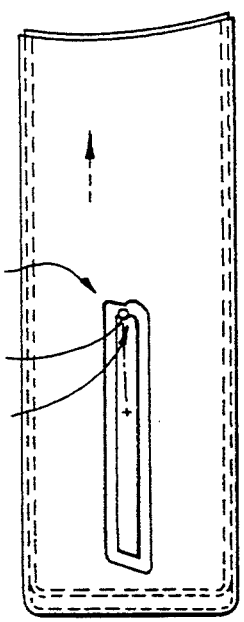
FIG. 4a is a vertical cross-section of an apparatus for storing coins in a vehicle according to the present invention in the stored position.
Figure 4B:
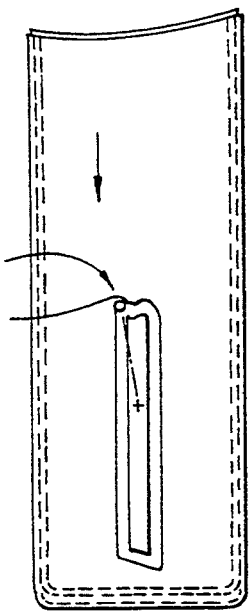
FIG. 4b is a vertical cross-section of an apparatus for storing coins in a vehicle according to the present invention in the unlatching position.
Figure 5:
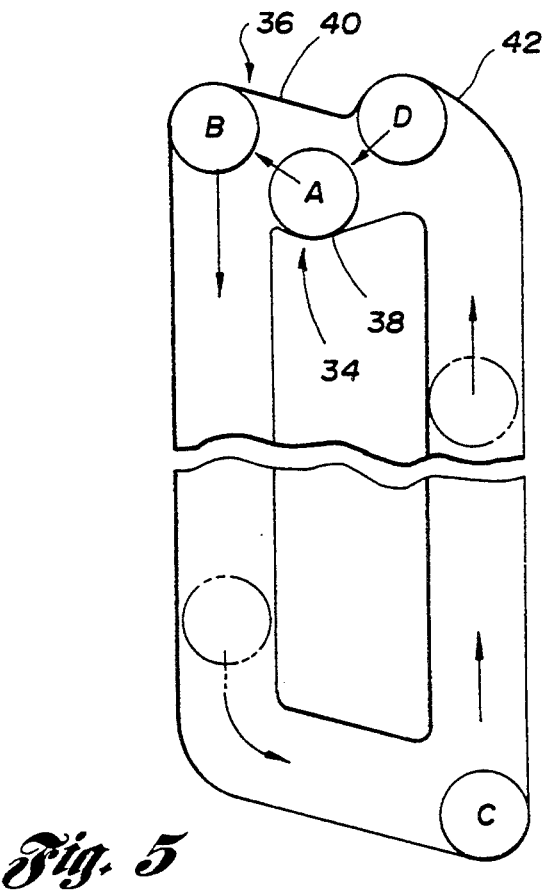
FIG. 5 is an enlarged schematic illustration of a follower traveling around a cam track according to the present invention.

As shown in FIGS. 4a and 5, the first portion 34 of the cam track 30 includes an inner edge 38 of the cam track 30 for selective cooperation with the follower 32 after the carrier 12 is moved into the stored position 20 in the housing 10. In the stored position, the follower 32 rests against the inner edge 38 of the cam track 30 to stop the spring 24 from moving the carrier 12 out of the stored position.

The operation of this apparatus is similar to that of a push-button pen. When access to the coinholders is desired, the user simply pushes the carrier 12 into the housing 10. The release mechanism places the second portion 36 of the cam track 30 in selective cooperation with the follower 32 in response to this push. The outer edge 40 of the cam track 30 comes into contact with the follower 32, and guides the follower 32 away from the first portion 34 of the cam track 30 to allow movement of the carrier 12 toward the use position 22.

Figure 4C:
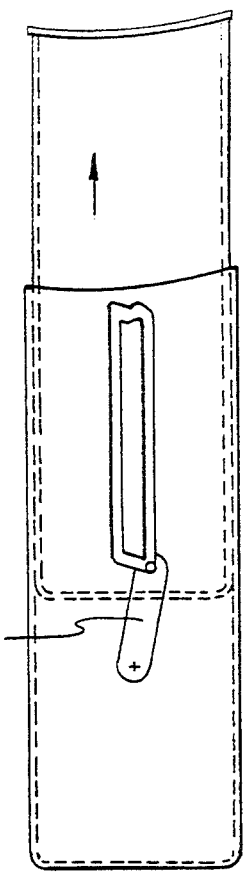
FIG. 4c is a vertical cross-section of an apparatus for storing coins in a vehicle according to the present invention in the use position.

In other words, as shown in FIG. 5, when the carrier 12 is in the stored position, the follower 32 is in position A and rests against the inner edge 38 of the cam track 30. When the carrier is pushed, the follower 32 travels along the outer edge 40 of the cam track to the unlatched position B. In the unlatched position B, the follower 32 has cleared the inner edge 38 of the cam track 30 and is free to move down the cam track 30 to the use position C, as shown in FIG. 4c. This movement is facilitated by the spring.

Figure 4D:
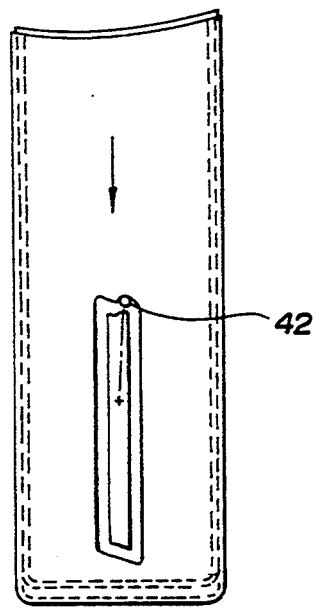
FIG. 4d is a vertical cross-section of an apparatus for storing coins in a vehicle according to the present invention in the latching position.

As shown in FIGS. 4d and 5, in order to return the carrier 12 to the stored position 20 from the use position 22, the carrier must simply be pushed back into the housing. In the use position, the follower is at position C in FIG. 5. When the carrier is pushed, the follower 32 travels up the cam track 30. The latching edge 42 guides the follower 32 to the D position. When the user releases the carrier, the spring 24 forces the carrier toward the use position and the follower 32 moves along the inner edge 38 of the cam track 30 to the stored position A, where it rests until the carrier is pushed.

Returning to FIG. 2, the apparatus for storing coins further includes a rotary viscous damper 44 which provides damping means between the housing 10 and the carrier 12 for damping motion of the carrier 12 relative to the housing 10. The rotary viscous damper 44 is operatively connected between the housing 10 and the rotatable gear 46 for damping the rotary motion of the rotatable gear 46. A rack 48 is mounted to the carrier 12, such that the teeth of the rack 48 are engageable with the teeth of the rotatable gear 46. Thereby, the viscous damper 44 dampens motion of the carrier 12, thus providing a desired smooth motion of the carrier. U.S. Pat. No. 4,614,004 to Oshida, herein incorporated by reference, discloses a rotary viscous damper suitable for use in this application.

The carrier 12 includes an appearance cover 50 for covering the housing 10 and concealing the coinholders 14,16,18 when the carrier is in the stored position. In this manner, an apparatus for storing coins according to the present invention may be flush-mounted in a vehicle housing, such as a center console. The appearance cover 50 may be flush with the vehicle housing surface S and may have the same surface appearance as the surface S, thus giving the impression that the appearance cover 50 is part of the housing surface S.

While the best mode for carrying out the invention has been described in detail, those familiar with the art to which the invention relates will recognize various alternative designs and embodiments for practicing the invention as defined by the following claims.

What is claimed is:

1. An apparatus for storing coins in a vehicle center console comprising:
   a housing adapted to be located in the vehicle center console;
   a carrier movably connected with respect to the housing and including a coinholder, the carrier being movable between a stored position inside the housing to conceal the coinholder and a use position outside the housing to expose the coinholder sufficiently for easy access by a user; and
   means for moving the carrier vertically between the stored and use positions, including a spring elastically biasing the carrier toward the use position relative to the housing and a latch for retaining the carrier in the stored position, the latch including release means responsive to relative movement of the carrier in the direction away from the use position to permit the spring to move the carrier to the use position and to relatch the carrier to the stored position when the carrier is manually moved to the stored position by the user.

2. The coinholder of claim 1, wherein the latch includes a cam track and follower, the cam track having a first portion in cooperative relationship with the follower to retain the carrier in the stored position and having a second portion in selective cooperation with the follower to form the release means.

3. The coinholder of claim 2, wherein the first portion of the cam track includes an inner edge of the cam track for selective cooperation with the follower after the carrier is moved into the stored position in the housing.

4. The coinholder of claim 2, wherein the release means places the second portion of the cam track in selective cooperation with the follower in response to the relative movement of the carrier in the direction away from the use position, the second portion of the cam track guiding the follower away from the first portion to allow movement of the carrier toward the use position.

5. The coinholder of claim 1, further comprising damping means operatively connected between the housing and the carrier for damping motion of the carrier relative to the housing.

6. The coinholder of claim 1, wherein the spring comprises a constant-force, tape-measure type, rotary spring.

7. The coinholder of claim 1, wherein the carrier comprises an appearance cover for covering the housing when the carrier is in its stored position.

8. The coinholder of claim 5, wherein the damping means comprises:
   a rotatable gear;
   a rotary viscous damper operatively connected between the rotatable gear and the housing for damping the rotary motion of the rotatable gear; and
   a rack mounted to the carrier means, the teeth of the rack engageable with the teeth of the rotatable gear.

9. A coinholder for a vehicle center console, comprising:
   a housing adapted to be located in the vehicle center console;
   a carrier movably connected with respect to the housing and including a plurality of coinholders, the carrier being movable between a stored position inside the housing to conceal the coinholders and a use position outside the housing to expose the coinholders sufficiently for easy user access;
   means for moving the carrier vertically between the stored and use positions, comprising a spring operatively connected between the housing and the carrier for outwardly biasing the carrier relative to the housing, the means for moving the carrier including a latch for retaining the carrier in the stored position, the latch including a cam track and follower, the cam track having a first portion in cooperative relationship with the follower to retain the carrier in the stored position, the first portion of the cam track including an inner edge of the cam track for selective cooperation with the follower after the carrier is moved into the stored position in the housing, and the cam track having a second portion in selective cooperation with the follower to form a release means, the release means being responsive to relative movement of the carrier in the direction away from the use position to permit movement of the carrier to expose the coinholders for easy user access in the use position; and
   damping means operatively connected between the housing and the carrier for damping motion of the carrier relative to the housing, the damping means comprising: a rotatable gear; a rotary viscous damper operatively connected between the rotatable gear and the housing for damping the rotary motion of the rotatable gear; and a toothed member mounted to the carrier, the teeth of the toothed member engageable with the teeth of the rotary gear.

10. A method for providing coin storage in a vehicle, comprising:
    providing a chamber in a substantially horizontal surface of a vehicle center console for slidably receiving a carrier;
    movably connecting the carrier inside the chamber for selective movement between a storage position inside the chamber and a use position outside the chamber, the movement of the carrier being responsive to movement of the carrier in the direction away from the use position;
    biasing the carrier in the direction toward the use position; and
    connecting a plurality of coinholders to the carrier such that the coinholders are concealed when the carrier is in the storage position and exposed when the carrier is in the use position.

11. The method for holding coins of claim 10, further comprising:
    damping relative motion of the carrier and the housing.

12. An apparatus for storing coins in a vehicle, comprising:
    a carrier adapted to be movably connected with respect to a center console in the vehicle and including a plurality of coinholders, the carrier being vertically movable between a stored position inside the console to conceal the coinholders and a use position above the console to expose the coinholders sufficiently for easy user access; and
    means for moving the carrier between the stored and use positions, including a latch for retaining the carrier in the stored position, the latch including release means responsive to relative movement of the carrier in the direction away from the use position to permit movement of the carrier to expose the coins for easy user access in the use position.

13. The apparatus of claim 12, wherein the latch includes a cam track and follower, the cam track having a first portion in cooperative relationship with the follower to retain the carrier in the stored position and having a second portion in selective cooperation with the follower to form the release means.

14. The apparatus of claim 13, wherein the first portion of the cam track includes an inner edge of the cam track for selective cooperation with the follower after the carrier is moved into the stored position in the console.

15. The apparatus of claim 13, wherein the release means places the second portion of the cam track in selective cooperation with the follower in response to the relative movement of the carrier in the direction away from the use position, the second portion of the cam track guiding the follower away from the first portion to allow movement of the carrier toward the use position.

16. The apparatus of claim 12, further comprising damping means operatively connected between the console and the carrier for damping motion of the carrier relative to the console.

17. The apparatus of claim 12, wherein the means for moving the carrier comprises a spring operatively connected between the console and the carrier for biasing the carrier in the direction toward the use position.

* * * * *